US006105061A

United States Patent [19]
Nakai

[11] Patent Number: 6,105,061
[45] Date of Patent: Aug. 15, 2000

[54] HIERARCHICALLY DISTRIBUTED NETWORK MANAGEMENT SYSTEM USING OPEN SYSTEM INTERCONNECTION (OSI) PROTOCOLS

[75] Inventor: Shoichiro Nakai, Tokyo, Japan

[73] Assignee: NEC Corporation, Tokyo, Japan

[21] Appl. No.: 07/735,020

[22] Filed: Jul. 25, 1991

[30] Foreign Application Priority Data

Jul. 26, 1990 [JP] Japan .................................. 2-198926
Jul. 26, 1990 [JP] Japan .................................. 2-198927

[51] Int. Cl.[7] ...................................................... G06F 15/16
[52] U.S. Cl. ............................ 709/223; 709/230; 709/303
[58] Field of Search .................................... 395/200, 500, 395/800; 709/223, 230, 303

[56] References Cited

U.S. PATENT DOCUMENTS

| | | | |
|---|---|---|---|
| 4,991,133 | 2/1991 | Davis et al. | 395/375 |
| 5,007,080 | 4/1991 | MacMillan et al. | 379/269 |
| 5,136,716 | 8/1992 | Harvey et al. | 395/800 |
| 5,187,790 | 2/1993 | East et al. | 395/650 |
| 5,204,955 | 4/1993 | Kagei et al. | 395/575 |
| 5,317,568 | 5/1994 | Bixby et al. | 370/85.6 |

OTHER PUBLICATIONS

Bobrow et al., *The Loops Manual*, Xerox PARC, Dec. 1993.
Glenn Krasner, The Smalltalk–80 Virtual Machine, *Byte*, Aug. 1981, pp. 300–320.
Schelvis et al., "The Implementation of a Distributed Smalltalk", ECOOP '88 Proceedings, Lecture Notes in Computer Science 322, Springer–Verlag, pp. 212–232.
Gregg Foster, *Collaborative Systems and Multi–user Interfaces*, Computer Science Division, Univ. of California, Berkeley, 1986.

*Primary Examiner*—William M. Treat
*Attorney, Agent, or Firm*—Foley & Lardner

[57] ABSTRACT

A management system comprises a central management station and a plurality of remote management stations coupled to nodes of a communications network which interconnects the nodes using OSI protocols. The central management station comprises a first memory for storing attributes of managed objects which are supervised by the central management station. A central station controller is responsive to a request and accesses its memory if the request is concerned with the attributes stored therein or transmits a request to one of the remote stations If the request is not concerned with the stored attributes. Each remote management station comprises a memory for storing attributes of managed objects supervised by the remote management station. A remote station controller responds to the request from the central station by making access to the remote station memory if the request is concerned with the stored attributes or by transmitting a request to an associated network node If the request Is not concerned with the stored attributes.

5 Claims, 5 Drawing Sheets

FIG. 2a

Access Pattern Management Unit 10

| Managed Object Class | Access Pattern Identifier | Attribute | Destination for Setting | Destination for Retrieval |
|---|---|---|---|---|
| Equipment | "XYZ" | className | — | Memory 7 |
| | | equipmentStatus | Remote Station | Remote Station |
| | | signalStatus | — | Remote Station |
| | ----- | ----- | ----- | ----- |

FIG. 2b

Destinations Management Unit 11

| Managed Object Identifier | Managed Object Class | Access Pattern Identifier | Destination |
|---|---|---|---|
| Node 3-1 | Equipment | "XYZ" | Line 5-1 |
| Node 3-2 | Equipment | "XYZ" | Line 5-1 |
| Node 3-3 | Equipment | "XYZ" | Line 5-2 |
| Node 3-4 | Equipment | "XYZ" | Line 5-3 |
| ----- | ----- | ----- | ----- |

Legend: ——— Not accessible

FIG. 3a

Access Pattern Management Unit 20

| Managed Object Class | Access Pattern Identifier | Attribute | Destination for Setting | Destination for Retrieval |
|---|---|---|---|---|
| Equipment | "UVW" | equipmentStatus | Equipment | Memory 16 |
| | | signalStatus | — | Equipment |
| | — | | | |

FIG. 3b

Destinations Management Unit 21

| Managed Object Identifier | Managed Object Class | Access Pattern Identifier | Destination |
|---|---|---|---|
| Node 3-1 | Equipment | "UVW" | Line 6-1 |
| Node 3-2 | Equipment | "UVW" | Line 6-2 |
| — | | | |

Legend: —— Not accessible

FIG. 6b

| Managed Object Class | top |
|---|---|
| Attribute | className |
| Managed Object Class | equipment |
| Attribute | className |
| Attribute | status |
| Managed Object Class | modem |
| Attribute | className |
| Attribute | status |
| Attribute | data speed |
| ------------ | ------------ |

FIG. 6a

| Managed Object Class | top |
|---|---|
| Higher Class | — |
| Attribute | className |
| Managed Object Class | equipment |
| Higher Class | top |
| Attribute | status |
| ------------ | ------------ |
| Managed Object Class | modem |
| Higher Class | equipment |
| Attribute | data speed |
| ------ | ------ |

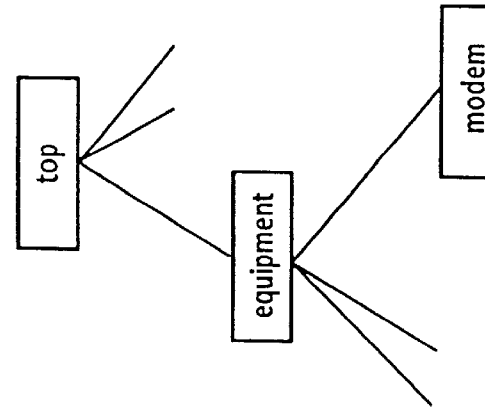

HIERARCHICALLY DISTRIBUTED NETWORK MANAGEMENT SYSTEM USING OPEN SYSTEM INTERCONNECTION (OSI) PROTOCOLS

BACKGROUND OF THE INVENTION

The present invention relates generally to communications systems, and more specifically to a network management system for OSI (Open Systems Interconnection) reference models.

According to the OSI management standards, the resources of a communications network that are supervised and controlled are called "managed objects" and defined in terms of their attributes using the formal descriptions prescribed by the international standards ISO/IEC DP 10165-1, 10165-2 and 10165-3. In a network management system, a database known as "management information base" must be created for the management of the attributes of various managed objects that are distributed throughout a communications network.

SUMMARY OF THE INVENTION

It is therefore an object of the present invention to provide a network management system that enables creating a management information base using OSI-based definitions for a communications network.

It is another object of this invention to provide a processing system which provides flexible adaptation to changes in formal descriptions of managed objects.

According to the present invention, there is provided a management system for a communications network comprising a plurality of network nodes interconnected by transmission lines. The management system provides management control on the communications network using OSI protocols and comprises a central management station and a plurality of remote management stations.

The central management station comprises a central-station memory for storing attributes of managed objects which are supervised by the central management station, a request entry unit for issuing an access request, and a controller responsive to the request for making access to the central-station memory if the request is concerned with the attributes stored in the central-station memory or transmitting a request to one of a plurality of first control lines if the request is not concerned with the attributes stored in the central-station memory.

The remote management stations are respectively coupled to the central management station through first control lines and respectively coupled through second control lines to the network nodes. Each remote management station includes a remote-station memory for storing attributes of managed objects supervised by the remote management station, a syntax analyzer for analyzing formal-description managed object definitions according to syntax rules and transforming the definitions into a form which can be translated into machine instructions, and a unit for establishing reference relationships between the formal-description managed object definitions.

A verification unit verifies the definitions transformed by the analyzer against the established reference relationships and are applied to an output unit which feeds back part of the verified definitions to the verification unit to allow it to perform verification on the definitions transformed by the analyzer against the part of the verified definitions.

A definitions entry unit receives the verified definitions from the verification unit and separates them into OSI-based and non-OSI-based definitions. To the definitions entry unit are connected an OSI-based definitions storage unit for storing the OSI-based definitions and a non-OSI-based definitions storage unit for storing the non-OSI-based definitions.

A controller is responsive to the request from the central management station for making a search through the stored OSI-based definitions to determine the executability of the request, reading a non-OSI based definition from the non-OSI-based definitions storage unit if the request is determined to be executable, and making access to the remote-station memory or transmitting a request to one of the network nodes depending on the read non-OSI-based definition.

BRIEF DESCRIPTION OF THE DRAWINGS

The present invention will be described in further detail with reference to the accompanying drawings, in which:

FIGS. 2a and 2b are tabulations of data stored in the access pattern management unit and destinations management unit, respectively, of the central management station;

FIGS. 3a and 3b are tabulations of data stored in the access pattern management unit and destinations management unit respectively, of each remote management station;

FIG. 5 is a tree diagram showing attributes in a hierarchical order; and

FIGS. 6a and 6b are tabulations of attributes which can be stored in the OSI-based definitions store of FIG. 1.

DETAILED DESCRIPTION

Figure 1:
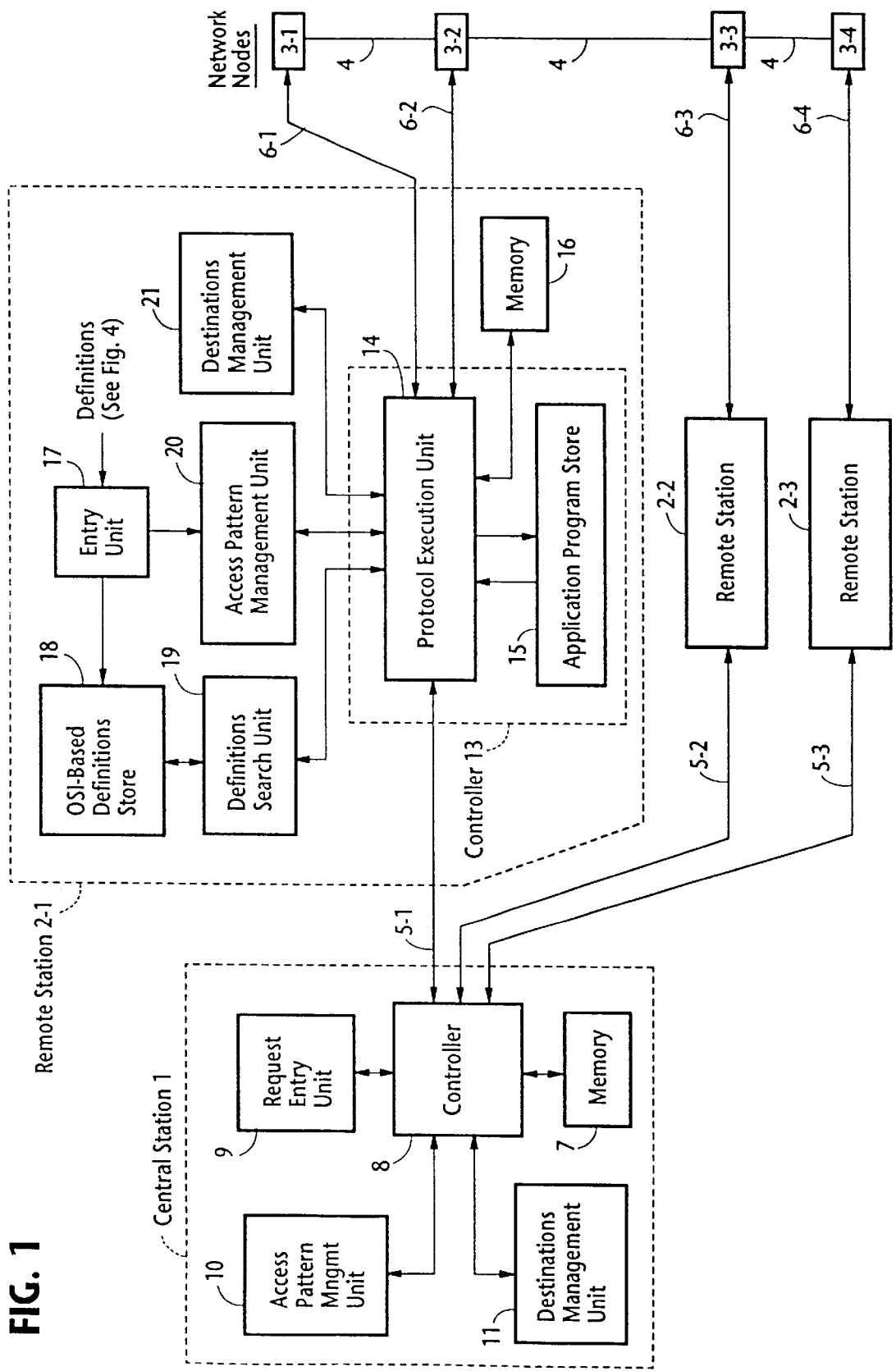
FIG. 1 is a block diagram of a network management system of the present invention for a communications network.

In FIG. 1, there is shown a network control system for a communications network according to the present invention. The system comprises a central management station 1 and a plurality of remote management stations 2-1, 2-2 and 2-3 which are connected through respective control lines 5-1, 5-2 and 5-3 to the central station on the one hand and connected via control lines 6-1–6-4 to network nodes 3-1 through 3-4. Network nodes 3-1–3-4 are interconnected by transmission lines 4 to constitute the communications network. Each network node is made up of communications "equipment" which are the objects of network management and will be referred to as such in the following description in so far as managed objects are concerned. Each remote management station supervises and controls the resources of the associated node and reports to the central station.

Central station 1 comprises a memory 7 in which the attributes of managed objects supervised by the central station are stored. A controller 8 is connected through control lines 5 to all remote stations to control the setting and retrieval of attributes of managed objects supervised by the remote stations. A request entry unit 9 is provided to issue access requests to controller 8 when accessing attributes of a managed object.

An access pattern management unit 10 and a destinations management unit 11 are connected to controller 8 The function of access pattern management unit 10 is to allow controller 8 to determine if the destination for access request resides within the central station memory 7 or within one of the remote stations. The function of destinations management unit 11, on the other hand is to allow controller to identify one of the remote stations if the destination is determined as such by access pattern management unit 10.

As an example, each network node 3 is defined by the request entry unit 9 as follows:

---

Equipment MANAGED OBJECT CLASS
    DERIVED FROM top
    ATTRIBUTES
        equipmentStatus GET-REPLACE,
        signalStatus GET;
    REGISTERED AS {example 1}

---

According to the above definitions, "equipment" is defined as a subclass for replicating the functions of "top" managed object class, and defined by adding to it a rewritable attribute "equipmentStatus" representing the status of that equipment and by a read-only attribute "signalStatus" representing the status of a signal of the equipment. The managed object is registered as "example 1." The attribute "top" is defined as a readonly attribute "className" to represent the class of the managed object. Therefore, the system is able to make reference to attributes "top" and "className".

As an example, access pattern management unit 10 is provided with a lookup table as shown in FIG. 2a. In the "managed object class" entry, "equipment" name is specified for a set of three attributes "className," "equipmentStatus" and "signalStatus." For each of these attributes entries "Destination for Setting" and "Destination for Retrieval" are specified as locations in which these attribute values are stored. An access pattern identifier "XYZ" is assigned to "equipment." This example indicates that attribute "className" can be retrieved from the central station memory 7, attribute "equipmentStatus" can be set into and retrieved from remote station by way of controller 8, and attribute "signalStatus" can be retrieved from remote station by way of controller 8, but no setting of attributes "className" and "signalStatus" is possible. Note that a plurality of access pattern identifiers can be assigned to a single managed object class.

Destinations management information is stored in destinations management unit 11 as shown in FIG. 2b. The information is tabulated into managed object identifiers Identifying Instances of managed objects, managed object classes of the instances, access pattern identifiers, and destinations when requesting access to a remote station. For example, managed object identifier assigned to an equipment in node 3-1 has a class name "equipment" under the entry "managed object class," and attribute setting and retrieval is permitted for that equipment by specifying it with its managed object identifier, its managed object class name and an access pattern identifier "XYZ." By specifying as such, an access request is sent from the central station through control line 5-1 to remote station 2-1.

More specifically, request entry unit 9 issues a request containing a managed object identifier, a managed object class and a code of a destination to which it desires to access. Controller 8 then makes a search through the lookup table of FIG. 2b to detect a corresponding access pattern identifier. Using the access pattern Identifier, controller 8 proceeds to search the lookup table of FIG. 2a to examine the contents of entries "settable destination" and "readable destination" and determines if the requested attribute resides in the central management station or in a remote management station. If controller 8 determines that the requested attribute is in the central station, it proceeds to execute the setting or retrieval of that attribute into or from memory 7 and returns an end-of-execution signal to request entry unit 9. If controller 8 determines that the requested attribute is in one of the remote stations, it applies an access request to one of the control lines 5-1–5-3 that is specified by the destinations management unit 11 and waits for the return of an acknowledgment from the remote station. On receiving the acknowledgment, controller 8 returns an end-of-execution signal to request entry unit 9.

All remote stations are of identical construction. Remote station 2-1, for example, comprises a controller 13 which includes a protocol execution unit 14 coupled to an application program store 15 and to a memory 16 in which attributes of managed objects are stored. Protocol execution unit 14 is connected through control line 5-1 to central station 1 and to network nodes 3-1 and 3-2 via control lines 6-1 and 6-2.

A definition entry unit 17 is connected to a processing system to receive from it managed object definitions of the form that can be translated into machine instructions. This processing system will be described later with reference to FIG. 4. Entry unit 17 analyzes the entered definitions for discrimination between OSI-based definitions and non-OSI-based definitions. The OSI-based definitions are applied to a store 18 in which they are hierarchically organized as will be described later. The non-OSI-based definitions are supplied to an access pattern management unit 20. A definitions search unit 19 is connected to the store 18 to make a search through the OSI-based definitions in response to a command signal from protocol execution unit 14. A destinations management unit 21 is also associated with the protocol execution unit 14.

Access pattern management unit 20 is provided with a lookup table as shown in FIG. 3a which is generally similar to that shown in FIG. 2a. "Equipment" name is specified under the entry "managed object class" and two attributes "equipmentStatus" and "signalStatus" are assigned. The attribute "className" listed in FIG. 2a is excluded as it is supervised by the central station. For each of these two attributes, a SET destination and GET destination are specified under the entries "Destination for Setting" and "Destination for Retrieval." An access pattern identifier "UVW" is assigned to "equipment." This example indicates that attribute "equipmentStatus" can be set into an equipment and retrieved from memory 16 through controller 13, and attribute "signalStatus" can be retrieved from the equipment through controller 13, but no setting of attribute "signalStatus" is possible. As in the central station, a plurality of access pattern identifiers can be assigned to a single managed object class.

Destinations management unit 21 is provided with a lookup table as shown in FIG. 3b to provide management of the attributes of the equipment of nodes 3-1 and 3-2. The stored information is tabulated into managed object identifiers identifying instances of managed objects, managed object classes of the instances, access pattern identifiers, and codes of destinations. For example, the managed object identifier assigned to an equipment in node 3-1 has a class name "equipment" under the managed object class entry, and attribute setting and retrieval is permitted for that equipment by identifying it with its managed object identifier, its managed object class name and an access pattern identifier "UVW." By specifying as such, an access request is sent from the remote station 2-1 through control line 6-1 to the desired equipment of node 3-1.

In response to a request from the central station, protocol execution unit 14 directs the search unit 19 to search the store 18 to determine if the parameters (such as managed object identifiers and attribute names) it contains are already defined or not, or settable or not (i.e., "get-only" item). If an affirmative decision is made, protocol execution unit 14 makes a search through the destinations management unit 21 first and then the access pattern management unit 20 in a manner similar to that performed by the central station's controller 8 and determines if the attribute requested by the central station is located In the remote station's memory 16 or in an equipment on the network side. If controller 13 determines that the requested attribute is in the remote station's memory 16, it reads it from the memory and returns an acknowledgment to the central station. Otherwise, controller 13 applies an access request to a control line specified by the destinations management unit 21 to wait for an acknowledgment returning from the network node connected to that control line. On receiving the acknowledgment, controller 13 notifies this fact to the central station.

Figure 4:
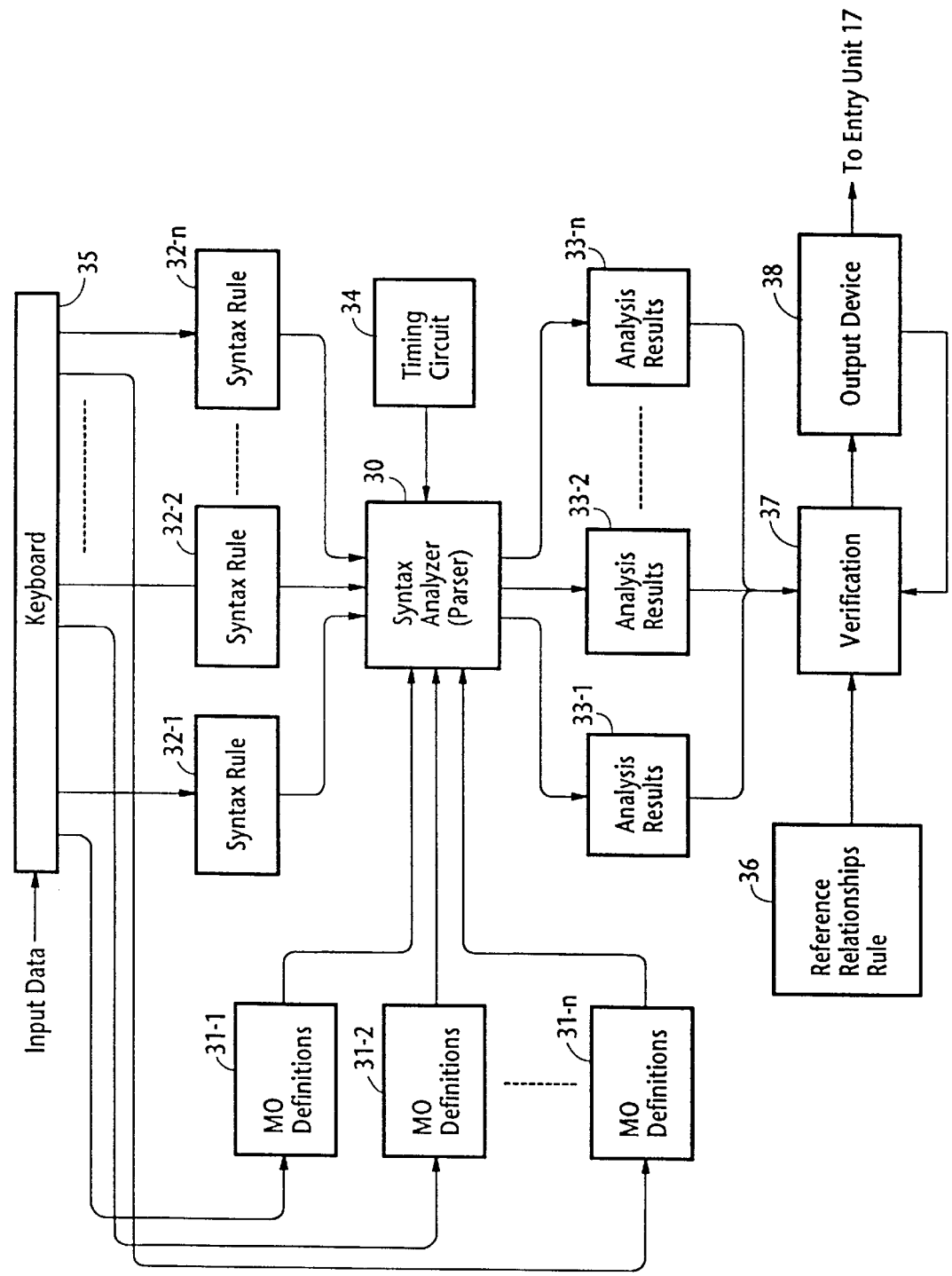
FIG. 4 is a block diagram of a data processor for creating managed object (MO) definitions in a form that can be translated into machine instructions.

The data entered into entry unit 17 are derived from a data processor shown in FIG. 4. The processor is made up of a syntax analyzer or parser 30 that analyzes MO (managed object) definitions supplied from each of a plurality of definitions modules 31-1, 31-2 . . . **31-*n* according to a formal description syntax rule supplied from a corresponding one of a plurality of syntax rule modules 32-1, 32-2 . . . 32-*n* and creates basic elements that can be translated into machine instructions. The syntax analysis is performed on a time-shared basis in response to signals from a timing circuit 34 and the results of each syntax analysis are stored into a corresponding one of a plurality of results modules 33-1, 33-2 . . . 33-*n*. The syntax rules and MO definitions can be altered with data supplied from a keyboard 35**.

A reference relationships rule is supplied from a relationship-rule module 36 to a verification unit 37 to which the output of each results module 33 is also supplied. The output of verification unit 37 is coupled to an output device 38 from which part of the verification output is fed back to verification unit 37.

Each of the syntax rules defines a data structure which is used to define managed objects. As indicated below, the managed object class is defined by the syntax rule as comprising elements such as class name, higher class parameter, attribute parameter and registration parameter and further defines the compositions of each of these elements.

```
<Managed Object Class>    = <Class name>
                            "MANAGED OBJECT CLASS"
                            <Higher class parameter>
                            <Attribute parameter>
                            <Registered parameter>
<Higher class parameter>  = "DERIVED FROM"
                            <Higher class name>
<Attribute parameter>     = "ATTRIBUTES"
                            <Attribute names> [<Attribute name>]
<Registered parameter>    = "REGISTERED AS"
                            <Label> <Integer>
where, the brackets [ ] indicate repetitions.
   The attribute is identified by "attribute definition parameter" which is
defined as follows:
<Attribute definition parameter> =  <Attribute name> "ATTRIBUTES"
                                    <Data structure definition>
                                    <Registered parameter>
<Data structure definition> =       "WITH ATTRIBUTE SYNTAX"
```

```
                            <Syntax name>
   As one example, managed objects in storage area 31 are defined
as follows:
objectClass-1   MANAGED OBJECT CLASS
       DERIVED FROM top
       ATTRIBUTES
           attribute-a
           attribute-b
REGISTERED AS classExample 1
attribute-a ATTRIBUTE
       WITH ATTRIBUTE SYNTAX Attribute-a
       REGISTERED AS attributeExample 2
```

In this example, objectClass-1 is an element that defines a managed object class and indicates one example of the MO definitions stored In definitions module 31-1. "Attribute-a" is an element defining an attribute that is defined by the managed object class and indicates one example of MO definitions stored in definitions module 31-2. The example above shows that the managed object class is defined so that "objectClass-1 " replicates functions from the managed object class "top" and has the same characteristics as "attribute-a" and "attribute-b", and is registered as "classExample 1." The attribute has a data structure represented by "attribute-a" and is registered as "attributeExample 2."

The rule supplied from relationship rule module 36 defines reference relationships between MO definitions in each of definitions modules 31 and those in another definitions module. Using the above examples, the reference relationships corresponding to the syntax rules applied to the managed objects "objectClass-1" and "attribute-a" are given as follows:

<Attribute name>IS DEFINED AT<Attribute definition parameter>

<Attribute name>IS REFERRED BY<Managed object class parameter>

The relationships imply that an attribute name is not only the parameter that is defined by an attribute definition parameter, but is referred to by a managed object class parameter. Attribute-a which is referred to by objectClass-1 is interpreted as an element that is defined by an attribute definition parameter. Therefore, if attribute-a is not defined by an attribute definition parameter, it is detected as a non-defined parameter.

Based on reference relationships indicated by module 36, verification unit 37 checks for the validity of the reference relationships established between the outputs of each results module 33 and those of another results module, and supplies its output to the output device 38. Verification unit 37 makes a further checking on part of data from the output device 38 for erroneously duplicated definitions.

In this way, errors inherent in system design specifications can be discovered prior to implementation of a network management system and allows flexible adaptation to changes in formal descriptions.

As described earlier, data from the output device 38 is applied to entry unit 17 (FIG. 1) in which it is examined for discrimination between OSI-based definitions and non-OSI-based definitions, and the former is fed into the store 18 and the latter to the access pattern management unit 20. As one example, the OSI-based definitions are organized according to a hierarchical relationship shown in FIG. 5, and written into the store 18 as shown in FIG. 6*a*. In FIG. 5 managed object class "modem" is shown as a subclass of "equipment" class which is in turn a subclass of a "top" class to replicate its functions.

As shown in FIG. 6a, a cell 40 stores a managed object class "top" having no higher classes from which It replicates functions. Cell 41 is left blank to indicate that there is no higher class for the managed object class "top." An attribute "className" is written for the managed object "top" into a cell 42. A managed object class "equipment" is written into a cell 43 and a parameter "top" is written into a cell 44 for indicating that the managed object class "equipment" replicates the functions of the managed object "top." A "status" indication is given to a cell 45 as an attribute of "equipment." A managed object class "modem" is stored into a cell 46, followed by a parameter "equipment" stored in a cell 47 indicating that "modem" replicates the functions of the "equipment." A parameter "data speed" may be stored into a cell 48 as an attribute of the "modem."

It is preferable that the OSI-based definitions be arranged as shown in FIG. 6b. According to this arrangement, a managed object class "top" is written into a cell 50, followed by its attribute "className" stored in a cell 51. Managed object "equipment" is assigned a group of cells 52, 53 and 54 in which managed object class (equipment), the attribute of its higher class (className) and its own attribute (status) into cells 52, 53 and 54 are respectively stored. Likewise, managed object "modem" is assigned a group of cells 55, 56, 57 and 58 in which managed object class "modem", the attribute of its highest class (className), the attribute of its second higher class (status), and its own attribute (data speed) are respectively stored. Since searches are not repeated on "higher class" cells, a higher speed of search can be made in comparison with the arrangement of FIG. 6a.

Search unit 19 responds to an access request from the central station by making a search through the store 18 to check to see if it has a corresponding definition in the store or determine if the request is settable into the desired access point or it relates to a "get-only" attribute.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A management system for a communications network containing a plurality of network nodes interconnected by transmission lines, said management system providing management control on said communications network using OSI (Open System Interconnection) protocols, and comprising:

a central management station comprising a central-station memory for storing attributes of managed objects which are supervised by the central management station, request entry means for issuing an access request, and control means responsive to the access request for making access to the central-station memory if the access request is the access request is concerned with the attributes stored in the central-station memory or transmitting a request to one of a plurality of first control lines if the access request is not concerned with the attributes stored in the central-station memory; and a plurality of remote management stations respectively coupled to said central management station through said first control lines and respectively coupled through a plurality of second control lines to said network nodes, each of the remote management stations comprising:

a remote-station memory for storing attributes of managed objects supervised by the remote management station;

a syntax analyzer for analyzing formal-description managed object definitions according to syntax rules and transforming the formal-description managed object definitions into transformed definitions which can be translated into machine instructions;

means for establishing reference relationships between said formal-description managed object definitions;

verification means for verifying the transformed definitions against said established reference relationships and producing verified definitions;

output means for receiving the verified definitions and applying part of the verified definitions as feedback to the verification means to allow the verification means to perform verification on the transformed definitions against said feedback;

definitions entry means for receiving the verified definitions from the verification means as received definitions and separating the received definitions into OSI-based definitions and non-OSI-based definitions;

OSI-based definitions storage means coupled to the definitions entry means for storing said OSI-based definitions;

non-OSI-based definitions storage means coupled to the definitions entry means for storing said non-OSI-based definitions; and control means responsive to the request from the central management station for making a search through the stored OSI-based definitions to determine the executability of said request, reading a non-OSI-based definition from said non-OSI-based definitions storage means if said request is determined to be executable, and making access to the remote-station memory or transmitting a request to one of said network nodes in accordance with the non-OSI-based definition.

2. A management system as claimed in claim 1, wherein the central management station includes control means comprising:

access pattern management means having a plurality of storage locations, each of the storage locations storing a first access code indicating whether said request is allowed to access the remote management stations in a write mode, a second access code indicating whether said request is allowed to access the central-station memory in a read mode or whether said request is allowed to access the remote management stations in a read mode, attribute names of a managed object class, and an access pattern identifier;

destination management means having a plurality of storage locations, each of the storage locations storing a managed object class, a managed object identifier identifying an instance of the managed object class, a destination code identifying one of said remote stations, and an access pattern identifier; and a controller for detecting an access pattern identifier in one of the storage locations of the destination management means according to a managed object identifier, a managed object class and a destination code contained in said access request from the request entry means and accessing the first and second access codes in one of the storage locations of the access pattern management means having the detected access pattern identifier to determine if said request is concerned with the attributes stored in the central-station memory or concerned with the attributes stored in the remote-station memory of one of the remote management stations.

3. A management system as claimed in claim 2, wherein the non-OSI-based definitions storage means comprises:

remote access pattern management means having a plurality of storage locations, each of the storage locations storing a first access code indicating whether the request from the central management station is allowed to access one of the network nodes in a write mode, a second access code indicating whether said request is allowed to access the remote station memory in a read mode or whether said request is allowed to access said network node in a read mode, attribute names of a managed object class, and an access pattern identifier; and remote destination management means having a plurality of storage locations, each of the storage locations storing a managed object class, a managed object identifier identifying an instance of the managed object class, a destination code identifying one of the network nodes, and an access pattern identifier;

wherein said control means further comprises means for detecting an access pattern identifier in one of the storage locations of the remote destination management means according to a managed object identifier, a managed object class and a destination code contained in said request from the central management station and accessing the first and second access codes from one of the storage locations of the remote access pattern management means having the detected access pattern identifier to determine if said request is concerned with the attributes stored in the remote-station memory or concerned with attributes supervised by the network nodes.

4. In a management system for a communications network having a plurality of network nodes interconnected by transmission lines, said management system having a central management station and a plurality of remote management stations connected to said network nodes, said central management station and said remote management stations providing management control of said communications network using OSI (Open Systems Interconnect) protocols, each of the remote management stations comprising:

a syntax analyzer for analyzing formal-description managed object definitions according to syntax rules and transforming the formal-description managed object definitions into transformed definitions which can be translated into machine instructions;

means for establishing reference relationships between said formal description managed object definitions;

verification means for verifying the transformed definitions against said established reference relationships producing verified definitions;

output means for receiving the verified definitions and applying part of the verified definitions as feedback to the verification means to allow the verification means to perform verification on the transformed definitions against said feedback;

input means for receiving the verified definitions from the verification means, making a discrimination between OSI-based definitions and non-OSI-based definitions;

definitions storage means coupled to the input means for storing said OSI-based definitions; and search means coupled to the definitions storage means and responsive to a request from the central management station for making a search through the stored OSI-based definitions to determine the executability of said request;

access pattern management means coupled to said input means for receiving the non-OSI-based definitions and having a plurality of storage locations, each of the storage locations storing a first access code indicating whether a request from the central management station is allowed to access one of the network nodes in a write mode, a second access code indicating whether said request is allowed to access a remote-station memory in a read mode or whether said request is allowed to access said network node in a read mode, attribute names of a managed object class, and an access pattern identifier;

destination management means having a plurality of storage locations, each of the storage locations storing a managed object class, a managed object identifier identifying an instance of the managed object class, a destination code identifying one of the network nodes, and an access pattern identifier; and a controller, responsive to a determination by said search means that said request is executable, for detecting an access pattern identifier in the destination management means according to a managed object identifier, a managed object class and a destination code contained in said request and accessing the first and second access codes in the access pattern management means having the detected access pattern identifier to determine if said request is concerned with the attributes stored in the remote-station or concerned with attributes supervised by the network nodes.

5. A management system as claimed in claim 1, wherein the non-OSI-based definitions storage means comprises:

remote access pattern management means having a plurality of storage locations, each of the storage locations storing a first access code indicating whether the request from the central management station is allowed to access one of the network nodes in a write mode, a second access code indicating whether said request is allowed to access the remote-station memory in a read mode or whether said request is allowed to access said network node in a read mode, attribute names of a managed object class, and an access pattern identifier; and remote destination management means having a plurality of storage locations, each of the storage locations storing a managed object class, a managed object identifier identifying an instance of the managed object class, a destination code identifying one of the network nodes, and an access pattern identifier, wherein the central management station includes control means comprising means for detecting an access pattern identifier in one of the storage locations of the remote destination management means according to a managed object identifier, a managed object class and a destination code contained in said request from the central management station and accessing the first and second access codes in one of the storage locations of the remote access pattern management means having the detected access pattern identifier to determine if said request is concerned with the attributes stored in the remote-station memory or concerned with attributes supervised by the network nodes.

* * * * *